US008095473B2

(12) United States Patent
Williams

(10) Patent No.: US 8,095,473 B2
(45) Date of Patent: *Jan. 10, 2012

(54) PROCESS AND ARCHITECTURE FOR STRUCTURING FACILITIES REVENUE BOND FINANCING

(76) Inventor: Linda Grant Williams, Bedford, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/624,361

(22) Filed: Nov. 23, 2009

(65) Prior Publication Data

US 2010/0138336 A1 Jun. 3, 2010

Related U.S. Application Data

(63) Continuation-in-part of application No. 11/681,166, filed on Mar. 1, 2007, now Pat. No. 7,840,497, which is a continuation-in-part of application No. PCT/US2006/031358, filed on Aug. 11, 2006, which is a continuation of application No. 11/202,194, filed on Aug. 12, 2005.

(51) Int. Cl.
*G06Q 10/00* (2006.01)
(52) U.S. Cl. ........................ 705/307; 705/313
(58) Field of Classification Search ............... 705/35, 705/36 R, 38–40, 307, 313–315; 707/607
See application file for complete search history.

(56) References Cited

U.S. PATENT DOCUMENTS

| 6,154,730 | A  | * | 11/2000 | Adams et al. | 705/36 R |
|---|---|---|---|---|---|
| 2002/0040339 | A1 | * | 4/2002 | Dhar et al. | 705/38 |
| 2002/0156709 | A1 | * | 10/2002 | Andrus et al. | 705/35 |
| 2003/0028479 | A1 | * | 2/2003 | Kirksey | 705/38 |
| 2003/0130865 | A1 | * | 7/2003 | Fitzgibbon et al. | 705/1 |
| 2004/0098329 | A1 | * | 5/2004 | Tilton | 705/36 |
| 2005/0119962 | A1 | * | 6/2005 | Bowen et al. | 705/37 |

OTHER PUBLICATIONS

U.S. CMBS Legal and Structure Finance Criteria, Standard & Poor's Ratings Services, May 2003, Section 4.*
Lisa Sander's article Denver Sports Arena Opens New Doors by Using Asset Backed Financing, Bond Buyer, May 28, 1998, vol. 324, issue 30402, p. 43.*

* cited by examiner

*Primary Examiner* — Mary Cheung
(74) *Attorney, Agent, or Firm* — Williams Mullen; Timothy J. Bechen

(57) ABSTRACT

In accordance with at least one embodiment of the invention, a process and architecture may be implemented to structure bond financing or refinancing for any municipally owned transportation facilities construction and/or renovation to improve economic and business terms for involved or interested parties.

18 Claims, 9 Drawing Sheets

INVENTION- REFINANCING GROUND LEASE/LEASE
ASSIGNMENT/SUBLEASEBACK ARCHITECTURE

INVENTION- REFINANCING GROUND
LEASE/LEASE ASSIGNMENT/
SUBLEASEBACK ARCHITECTURE

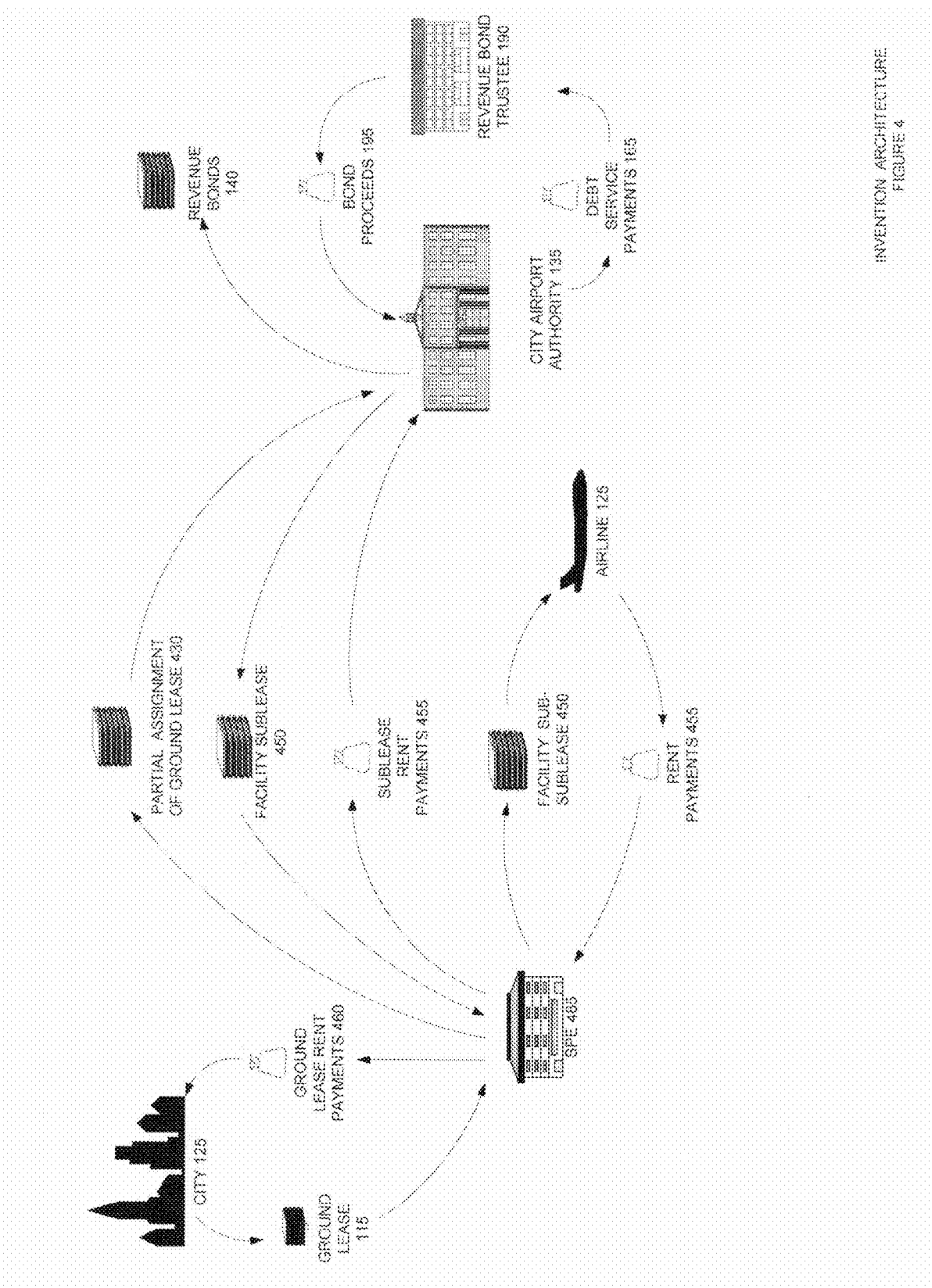

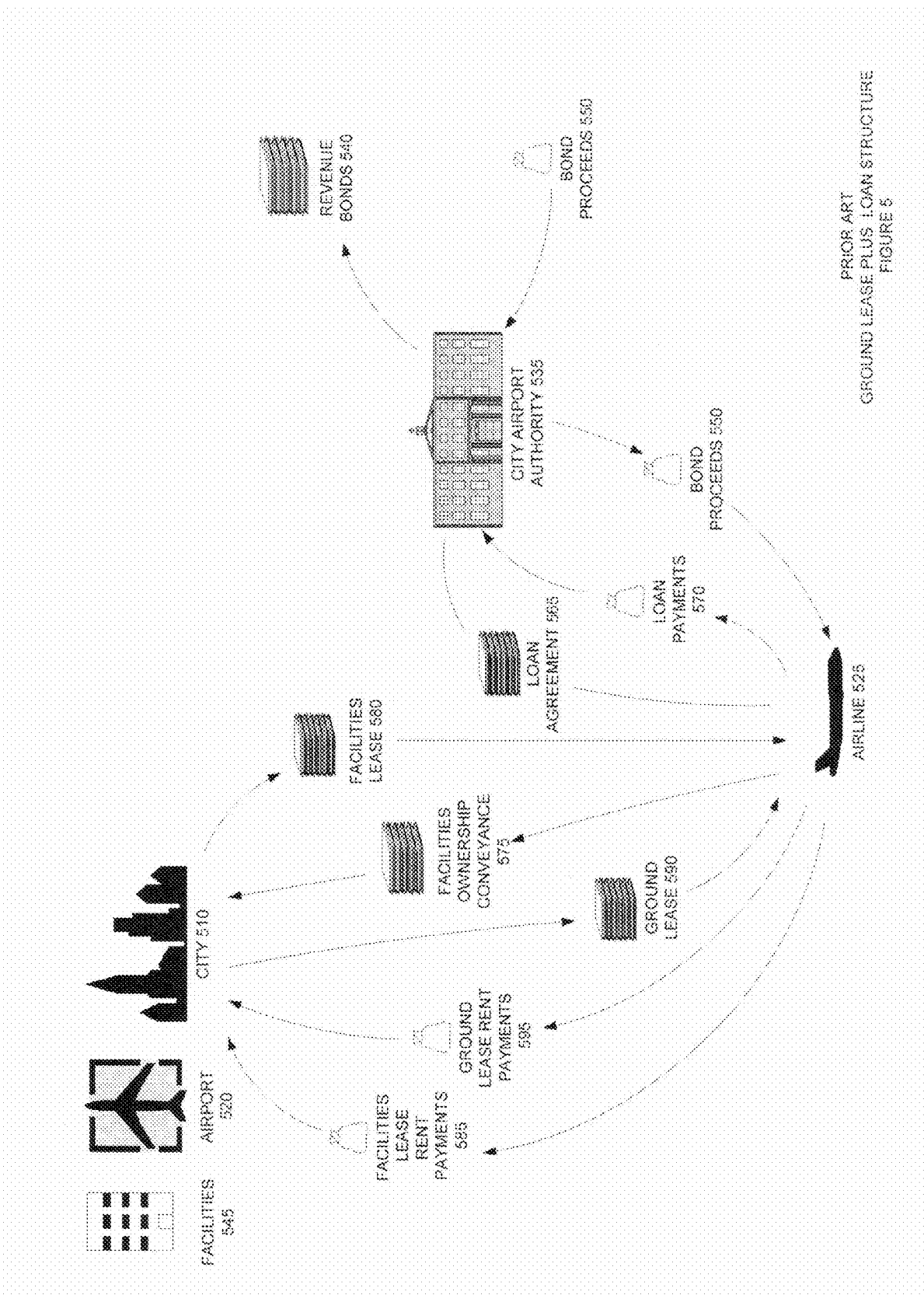

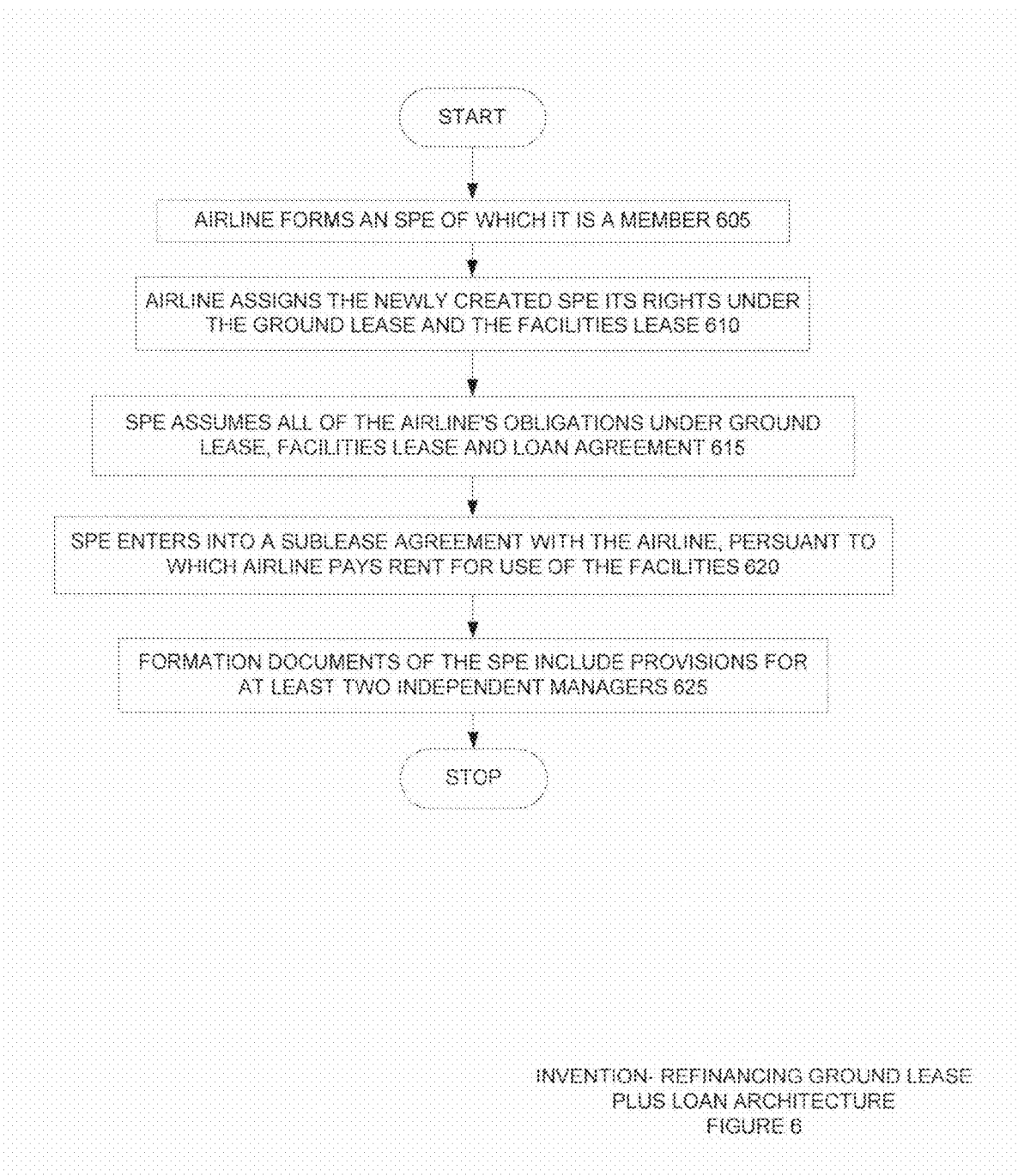

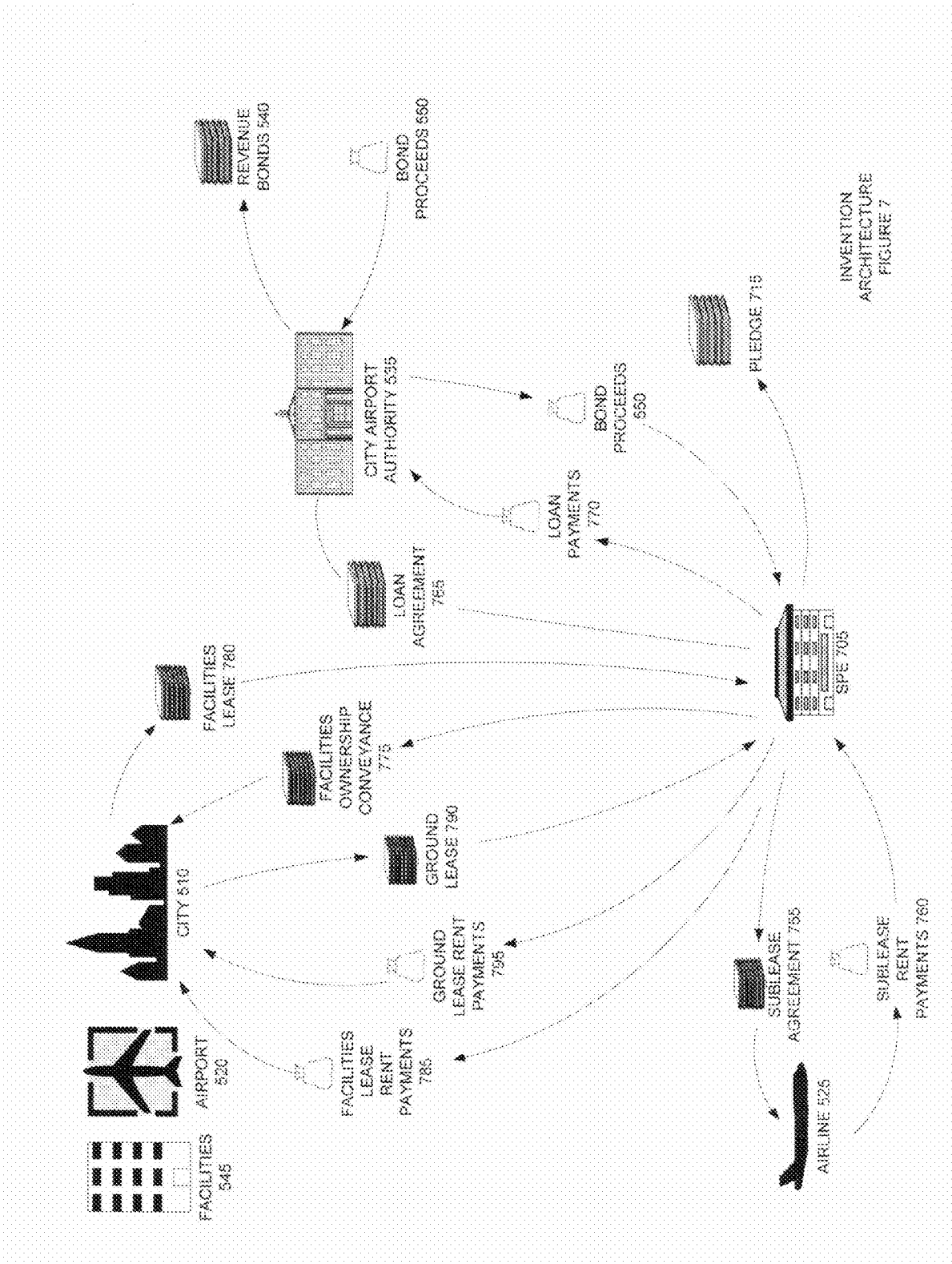

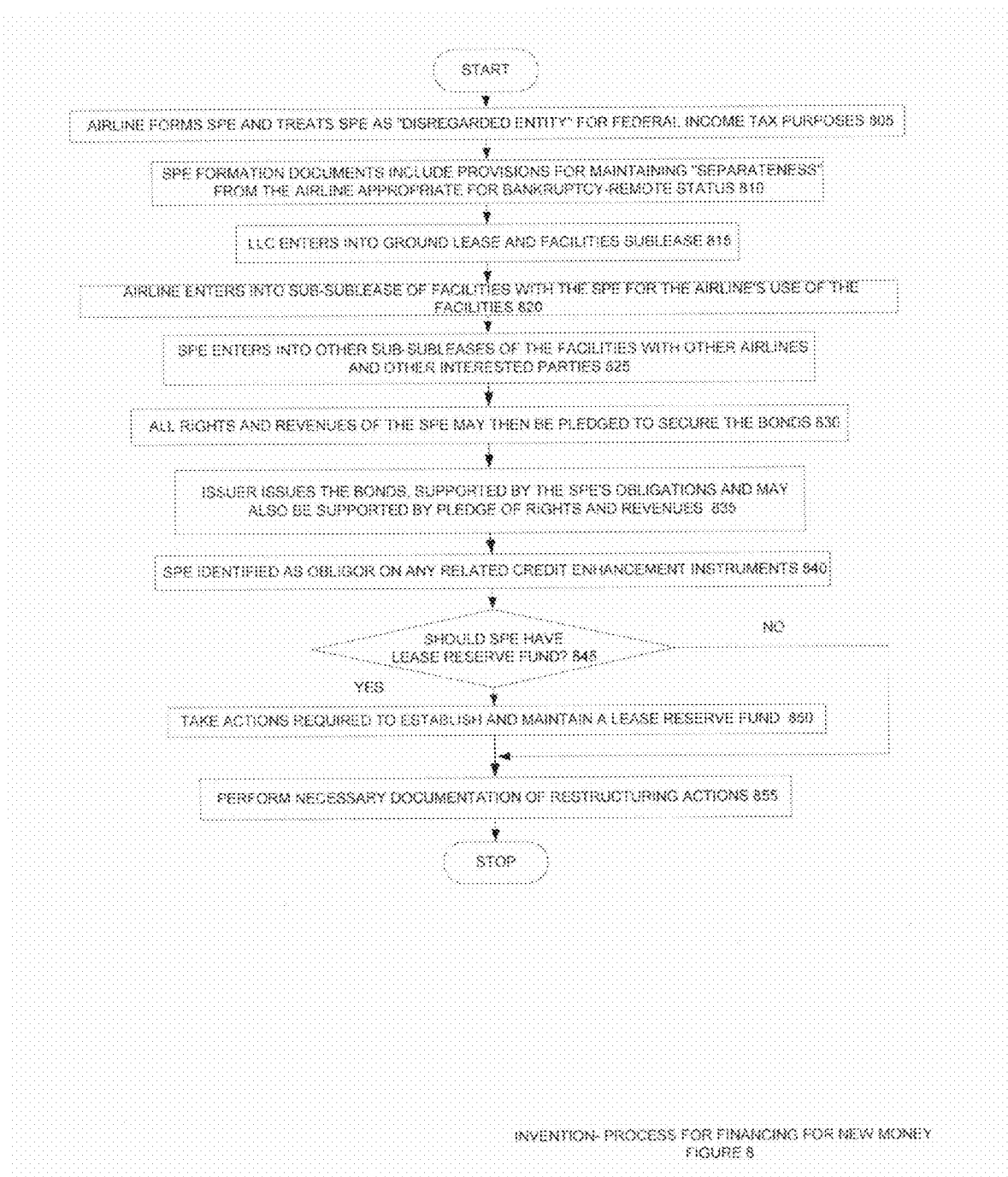

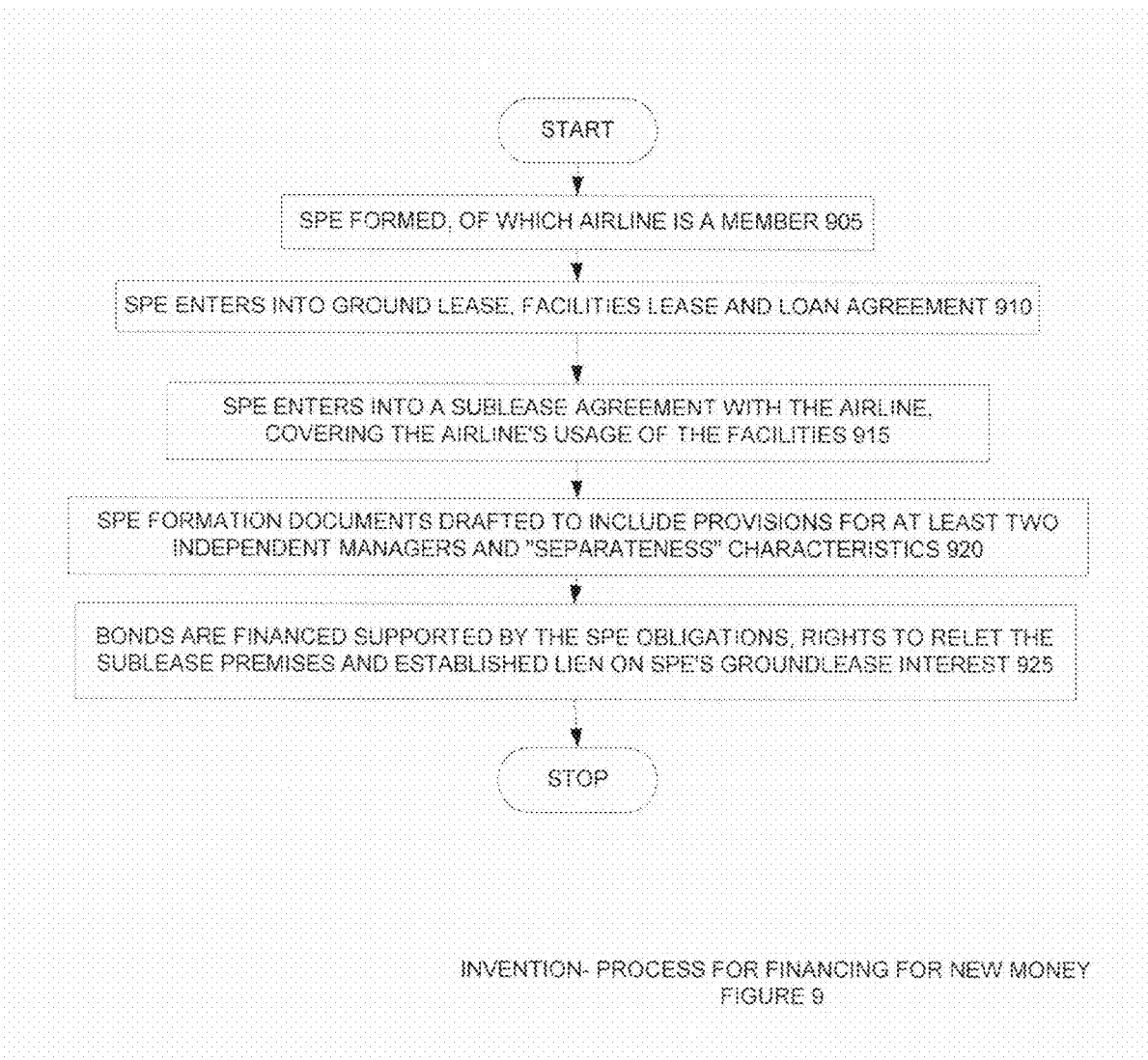

PROCESS AND ARCHITECTURE FOR STRUCTURING FACILITIES REVENUE BOND FINANCING

RELATED APPLICATIONS

This application is a Continuation-in-part of U.S. application Ser. No. 11/681,166 filed Mar. 1, 2007 now U.S. Pat. No. 7,840,497 which is a Continuation-in-part of PCT/US06/31358, filed Aug. 11, 2006 which is a Continuation of U.S. Ser. No. 11/202,194, filed Aug. 12, 2005, all entitled "Process And Architecture For Structuring Facilities Revenue Bond Financing."

FIELD OF THE INVENTION

The present invention generally relates to financing structures/architectures associated with bond financing.

BACKGROUND OF THE INVENTION

Conventionally, in facilities revenue bond financing, bonds issued to finance the construction or renovation of facilities, for example, airport terminal facilities, have been either of two types: (1) bonds supported by the revenues of the airport commonly referred to as General Airport Revenue Bonds or "GARBs," or (2) special facilities revenue bonds, supported by the credit of, typically, one or more airline(s), which are the principal user(s) of the facility. Historically, GARBs supported by the revenues of the airport have not been subject to default, i.e., failure to pay principal or interest when due. However, due to various U.S. and global events and economic trends, special facilities revenue bonds associated with facilities utilized by the airline industry are more often the subject of default; this is because an airline whose payment obligations support the payment of principal and interest on the bond may be unable to timely repay its obligations due to economic woes. Therefore, as fuel and labor costs continue to escalate in the U.S. domestic airline industry, the frequency of airline bankruptcies has increased; thus, it is likely that the incidence of special facilities bond defaults will continue to increase.

The financing of the construction of sports arenas has also included the securitization of sports arena revenue streams. In securitizations, generally the idea is to sell the revenue streams payable to the sponsor from highly creditworthy third parties. It is absolutely standard to use a special purpose entity to buy the assets and seek a financing of them independent of the sponsor (who usually has other debt and business/bankruptcy risk). The present inventor has been engaged in such financing, and has applied securitization techniques to isolate the revenue streams to be generated from teams playing at a new arena and use those revenue streams to obtain more favorable financing terms. Prior to that effort, sports facilities had been financed on the basis of their whole-revenue or mortgage of the facility, without isolating the best income streams.

What remains needed in the art, however, is a refinance methodology in which lease relationships are rearranged without the need to securitize anything.

SUMMARY OF THE INVENTION

In accordance with at least one embodiment of the invention, a process and architecture may be implemented to initially structure or restructure bond financing for facilities construction and/or renovation to improve the economic and legal terms for involved or interested parties.

BRIEF DESCRIPTION OF THE DRAWINGS

FIG. 4 illustrates a restructured financing architecture provided in accordance with at least one embodiment of the invention.

FIG. 5 illustrates an existing, conventional "ground lease plus loan" financing architecture.

FIG. 6 illustrates various operations performed in connection with restructuring financing architectures in accordance with at least one embodiment of the invention.

FIG. 7 illustrates a restructured financing architecture provided in accordance with at least one embodiment of the invention.

FIG. 8 illustrates various operations performed in connection with structuring of financing architectures in accordance with at least one embodiment of the invention.

FIG. 9 illustrates various operations performed in connection with structuring of financing architectures in accordance with at least one embodiment of the invention.

DETAILED DESCRIPTION OF INVENTION

Figure 1:
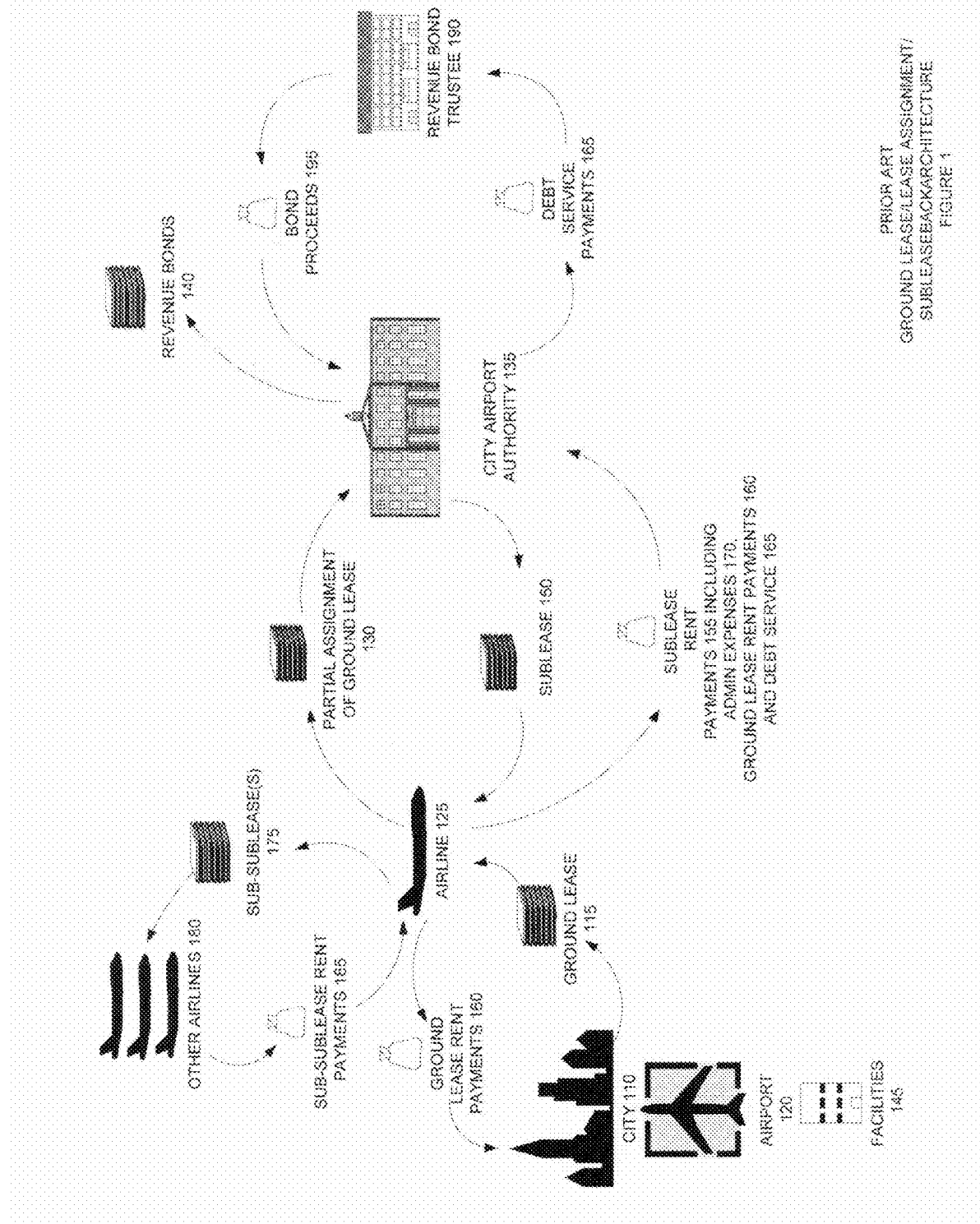
FIG. 1 illustrates an existing, conventional "ground lease/lease assignment/subleaseback" financing architecture.

Although various invention embodiments are disclosed herein in the context of financing or refinancing airport related facilities, it should be understood that the invention may be implemented in connection with the financing or refinancing of any infrastructure facility for public and/or multiple private user benefit. An example of a further application of the invention is in connection with the construction of port docking facilities for cargo ships affiliated with various cargo lines and cruise ships affiliated with various cruise lines. Invention embodiments may be implemented in connection with the financing or refinancing of all manner of transportation-related facilities including, but not limited to air, rail, port, and road. Thus, it should be understood that utility is provided by invention embodiments in any business scenario wherein single or multiple transportation facilities are constructed or renovated for use by the public and/or multiple private entities using funds obtained through the issuance of taxable or tax-exempt bonds.

In accordance with at least one embodiment of the invention, the inventive concept may be implemented to perform airport facilities financing to avoid or partially or fully remedy problems associated with declining credit ratings of airlines. In that particular implementation, the invention applies to so-called "single facilities revenue bond financings", in which the financing for a facility is supported by the credit of one or more sponsoring airlines. In such an implementation, the process and architecture apply both to new and existing financings, and may be implemented to assist in insulating a financing from a bankruptcy of the sponsoring airline(s).

A key to any such financing or refinancing situation, is that the revenue-producing potential of a facilities improvement, e.g., a new or renovated terminal, should be well recognized. If there is sufficient potential demand for use of such facilities by parties other than the sponsoring airline, the demand may provide a better credit than that of the individual airline whose payments initially support the bonds. In such instances, asset-backed financing techniques may be applied to finance or refinance the facility on a basis that is supported only by credit of a Single Purpose Entity (SPE), which is able to sublet the facility to the airline or other carriers or users. That SPE would have rights to any present and potential revenues of the facility, e.g., an airline terminal. Transactions would be structured to provide financing that would be remote, or insulated, from the bankruptcy of the airline(s) or other users of the terminal.

This new financing process and architecture is applicable to new facilities improvements and also the refinancing of existing airline facilities improvements, including but not limited to equipment and/or improvements for airport facilities including terminal(s), cargo handling, maintenance, parking, concession areas, car rental services, baggage, security and other facilities. It is also applicable to port docking facilities, which are also, in some locations, typically in demand by a variety of cargo companies and cruise lines.

To provide some context so as to better understand the nature of the innovation provided by the invention, the state of conventional financing practices will now be explained. Conventionally, there are generally three common architectures that have been used for special facility bond financing of airport facilities.

A conventional "package ground lease" architecture involves a government owner leasing ground directly to an airline and undertaking to, itself, issue bonds to finance the facilities or facilities improvements. Lease revenue compensates not only for the use of the land but also the use of the improvement and provides amounts to cover debt service on the bonds. The Denver airport special facility revenue bonds for United Airlines were issued in this manner.

A conventional "ground lease plus loan" architecture involves a government owner leasing ground to an airline and having the same or another government agency undertake to issue the bonds and loan the proceeds to the airline to cover the costs of the construction of facilities or facilities improvements. The bond lien, if any, often does not encumber the ground lease, and the ground lease typically does not provide for default in the event of a default under the loan. As a result, it is unclear whether default on the loan can result in default under the ground lease, provided the ground lease payments are otherwise being made. Such an ambiguity can enable a bankrupt airline to stop making loan repayments (putting the bonds in default) while still retaining possession of the facility under the ground lease.

A conventional "ground lease/lease assignment/subleaseback" architecture involves a government owner leasing ground to an airline and the airline partially assigning ground lease rights to a separate government agency bond issuer. The government agency bond issuer issues bonds to finance construction of the facilities and subleases the partially assigned-ground lease rights and facilities back to airline in return for sublease rent on terms sufficient to support the creditworthiness of the arrangement and to permit the conclusion that the sub-sublease is a "true lease" for federal bankruptcy purposes. The sublease is keyed to the maturity of the bonds; the ground lease partial assignment is coterminous with the sub-lease. Additionally, both the sublease and the partial ground lease assignment terminate on prepayment of bonds. As a result, the purported issuer/sublessor has no residual interest in financed facilities that survives retirement of the bonds.

It is also noted that the present invention is applicable for being performed or executed in a computing environment. The loan and bond financing structure can be implemented in a computer-implemented environment including processing operations performed by a computer-processing device. For example, a physical processor may perform computational processing operations in response to executable code physically stored in a computer readable medium. The herein described architecture is fully implemented within a computing environment allowing for software or hardware processing of operations to perform the described functionality, as well as generate the transformative results described herewith.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Recently, various bankruptcy court decisions (see *United Airlines, Inc. v. HSBC Bank USA, N.A.*, No. 04-4209 (7th Cir. Jul. 26, 2005) *rev'g HSBC Bank USA v. United Air Lines, Inc.*, 317 B.R. 335 (N.D. Ill. 2005) (San Francisco International Airport) and *In re UAL Corp.*, 307 B.R. 618 (Bankr. N.D. Ill. 2004) *aff'd in part by United Air Lines, Inc. v. HSBC Bank USA*, 322 B.R. 347 (N.D. Ill. 2005) (Denver International Airport) *and by The Bank of New York v. United Air Lines, Inc.*, No. 04-2838 (N.D. Ill. Feb. 16, 2005) (JFK International Airport)) have held that a "package ground lease," as utilized at the Denver airport, was a true lease whereas "ground lease/lease assignment/subleaseback" architectures of the type described above were merely disguised debt financings, allowing an airline to remain in possession and relegating the bondholders to the status of creditors in the airline's bankruptcy, rather than having the benefit of the more favorable lessor position. These decisions have cast a cloud of ambiguity around the creditworthiness of the "ground lease/lease assignment/subleaseback" architectures in the event of a bankruptcy of an airline (although not involved in the United Airlines cases above, the "ground lease plus loan" architecture seems subject to the same risk).

This perceived deficiency affects both the attractiveness and plausibility of both new single facility revenue bond financings and existing special facility revenue bond financings structured as a ground lease/lease assignment and leaseback, where an existing financing requires a new credit judgment (e.g., on a proposed refinancing of the bonds, or on replacement of an expiring credit support facility). The deficiency may be corrected by amending the leases involved.

With this business context understood, invention embodiments apply common asset-backed financing techniques to issue bonds, or to refinance existing bonds, on a basis supported by the creditworthiness of a facility. Thus, in a scenario involving either the "ground lease plus loan" or "ground lease/lease assignment/subleaseback" architectures, if the revenue-producing potential of the facility may provide a superior credit risk than the airline utilizing the improvements, common asset-backed financing techniques may be applied to isolate the revenue stream through use of a single purpose entity ("SPE") from a possible bankruptcy of the affected airline.

For affected owners of municipal airports or seaports and airlines and private port operators, this inventive architecture and its associated creative process could significantly lower the effective costs associated with financing the facility, which savings could be realized by either the municipal port or airport owner or the airline tenant (or port operator) or shared by both. For credit-enhancement providers on existing bond financings, this inventive architecture and process could generate restructuring fees and lower or substantially eliminate their exposure to airline credit ratings. For bond underwriters, this architecture and process could provide an opportunity for new transactions and refinancing existing bond transactions providing meaningful benefits to airlines, municipal airports and their existing credit-support providers. For municipal airports, municipally owned seaports, and the like, this architecture and process could provide a mechanism to insulate their successful operations from potential credit exposure to the bankruptcy risks associated with port operators and/or airline carriers and if the two independent managers of the SPE are representatives of the host airport, the architecture and process can allow the airport to take control of the SPE and the terminal financed immediately after a payment default by the airline terminal.

A first example of a potential implementation of the above described embodiments is now provided. All figures depict an airport/airline but may be, by analogy, applied to other transportation assets. With reference to FIG. 1, consider an existing, conventional "ground lease/lease assignment/sublease-back" financing architecture, wherein a city 110 has entered into a ground lease 115 at airport 120 to airline 125. Airline 125 has partially assigned 130 the ground lease 115 to bond issuer 135 (e.g., an agency or instrumentality of city 110) for which the issuer 135 may assume a portion of the ground lease rents. Issuer 135 has issued revenue bonds 140 to finance the construction of facilities 145, e.g., improvements at a terminal at the airport or a maritime port 120. Issuer 135 has used the bond proceeds 195 to construct the facilities 145, and has then subleased 150 the assigned ground lease 130 and the associated improvements built thereon to airline (and may also be applied to a seaport operator pursuant to a concession agreement) 125 in exchange for the undertaking of airline 125 to pay sublease rent payments 155 equal in aggregate amount to a portion of the related ground lease rent payments 160 (if any), the debt service 165 on the bonds 140, and administrative expenses 170 relating to the bonds 140. After application to pay related ground lease rents 160, the balance of such sublease rents 155 is provided to the revenue bond trustee 190 to pay administrative expenses 170 and the debt service on the bonds 140. Debt service payments 165 are directed to the revenue bond trustee to be disbursed to bond holders.

The facilities 145 may be, for example, a terminal, or a related concourse, or fuel storage and supply facilities, cargo or baggage handling facilities, foreign inspection service (customs) facilities, aircraft maintenance and repair facilities, car rental facilities or cruise/cargo maritime docking facilities or some or all of the above. Airline 125 makes available a portion of the facilities 145 (by way of sub-sublease or gate or slot usage agreements 175) to other airlines and private concessionaires 180 on a profitable basis in return for sub-sublease rent payments. It is reasonable to expect that airline/port operator 125 could make substantially all of the facilities 145 available on a profitable basis, to the extent that airline/port operator 125 did not itself make use of them. However, if airline/port operator 125 is presently using substantially all of the facilities 145 itself, that same credit judgment may be more difficult to make, but still may be possible, on appropriate facts.

In accordance with at least one embodiment of the invention, airline 125 might undertake restructuring transactions as described with reference to FIG. 2. As illustrated in that figure, at 205, the airline (or the municipal airport or another party) may form an SPE and elect to treat that SPE as a "disregarded entity" for federal income tax purposes. Subsequently, at 210, the SPE creator may cause the SPE formation documents to include various customary and standard rating agency required provisions for maintaining "separateness" from equity owner appropriate for bankruptcy-remote status including, for example, establishment of a board of managers including at least two "independent managers," unrelated to the SPE equity owner (in this example, the airline), and providing that SPE is not authorized to take certain actions (for example, to liquidate or to file in bankruptcy, to dispose of substantial assets or to amend its formation documents) without the approval of all its managers, including the independent managers, etc. (as discussed herein). Subsequently, at 215, the airline (or port operator in a port concession arrangement) may contribute the airline's interest in the ground lease (or concession agreement) and in the facilities sublease to the SPE. The contributed facilities sublease interest may include the constructed facilities and the airline's interests in all sub-subleases to other airlines and other parties. The airline may then, at 220, cause the SPE to assume the obligations of the ground lease, the facilities sublease, and all other sub-subleases. Subsequently, or concurrently, at 225, the airline may enter into a sub-sublease of the facilities with the SPE for the airline's own use of the facilities. That sub-sublease may entail, for example, terms sufficient to support the creditworthiness of the arrangement and to permit the conclusion that the sub-sublease is a "true lease" for federal bankruptcy purposes. All rights and revenues of the SPE including sublease rental amounts paid by the airline may then be pledged to secure the SPE's assumed sublease obligations, and thus, the bonds (and the obligations to the credit support provider, if applicable). All of the foregoing may apply equally to a municipal airport or municipal seaport owned SPE which can sub-sublease to the airline or a municipal port owner or a private concessionaire.

Figure 2:
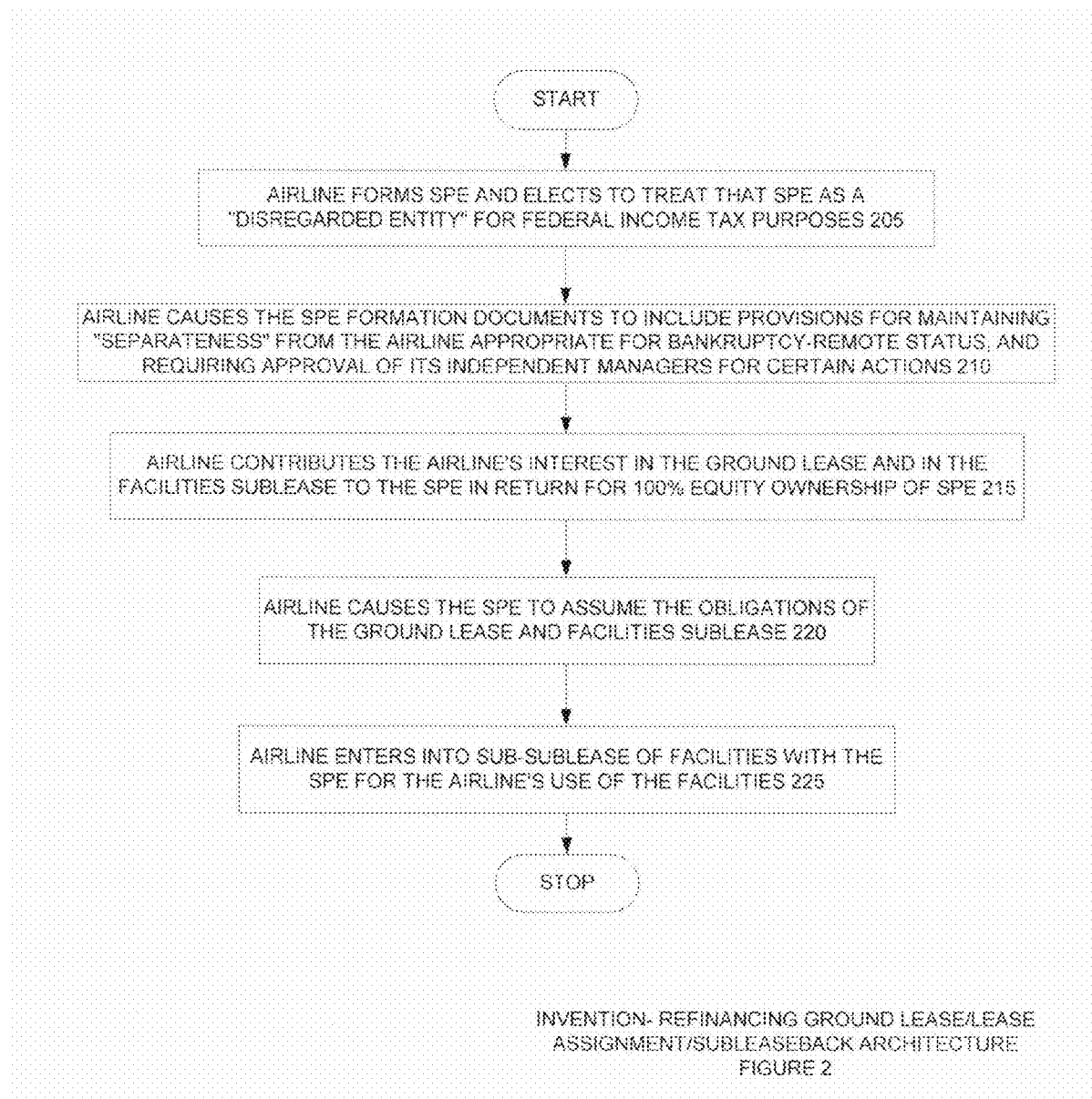
FIG. 2 illustrates various operations performed in connection with restructuring financing architectures in accordance with at least one embodiment of the invention.

It should be understood that the actions performed in FIG. 2 are merely illustrative of particular implementation options in accordance with at least one embodiment of the invention. Therefore, it is not necessary that the actions be performed in the order illustrated in FIG. 2; rather, each of those actions may be performed in various orders including simultaneously. Moreover, it should be understood that practice of the invention may not require performing all of the operations set forth in that figure or that those operations be performed specifically by the airline, airport owner, seaport concessionaire or the municipal owner of the maritime facilities.

Moreover, throughout the explanation of various invention embodiments, reference is made to an SPE, which may be, for example, any business entity such as a Limited Liability Company (LLC) or a Business Trust organized in any jurisdiction that enables favorable treatments for the purposes of bankruptcy and tax (e.g., Delaware) or other entity meeting rating agency criteria as a bankruptcy remote entity, but in each case, must be structured to conform to SPE criteria as dictated by the major U.S. rating agencies.

To establish a higher credit rating (e.g., investment grade) and, therefore markedly lowercost and, thus, more favorable financing terms, the SPE may not be vulnerable to unrestricted voluntary liquidation or dissolution in the event of a bankruptcy of the airline, or subject to substantive consolidation in such a bankruptcy. For the former purpose, the SPE's formation documents may provide for a managing board including at least two independent managers (who could be airport representatives), to be appointed by a party other than the airline (e.g., it could be a credit-support provider, a company providing corporate trust services, the airport or the city, if applicable). The SPE formation documents may further provide that the SPE could not take certain actions (for example, to file in bankruptcy or undergo a voluntary liquidation or dissolution, dispose of substantial assets, or to amend its formation documents) without the approving vote of its managers, including the independent managers.

To avoid substantive consolidation in bankruptcy, the SPE should establish its "separateness" from the airline (or other tenant vulnerable to bankruptcy) based on various customary standards that have been outlined by the rating agencies involved (e.g., Fitch Ratings, Moody's or Standard & Poors). These standards would be incorporated into its formation documents, which control its operation—e.g., the SPE will restrict its activities to only those necessary or incidental to its leasehold interests, management and operation of the facilities, and not engage in other businesses or activities, the SPE will hold itself out to the public as a legal entity separate and apart from its members or any other person, having its own assets, liabilities and operations—not constituting a branch or division of any of its members, affiliates or any other person, and not being liable for the debts of any such person.

Other such provisions dictated by the rating agencies may include the SPE undertaking (e.g., in the formation documents of the SPE) that SPE will act to (i) segregate its funds, property and other assets from those of any member or any other person and hold them in its own name, and not comingle them with those of any member or any other person; (ii) make any investments solely in its own name; (iii) not form any subsidiaries; (iv) act solely in its legal name in the conduct of its business, and conduct its business so as not to mislead others as to the identity of the entity or assets with which they are concerned; (v) keep and maintain separate records, books of account, bank accounts and financial statements; (vi) ensure that its capitalization is adequate in light of its business and purpose; (vii) not (a) guarantee, become obligated for, or otherwise hold itself out as being liable for, the debts and obligations of any member or any other person; (b) pledge its assets for the benefit of any other person; (c) make loans or advances to any person other than in the ordinary course of its business; and (d) acquire obligations or securities of any member; (viii) not enter into any transaction with any member, except upon terms and conditions that are intrinsically fair and substantially similar to those that would be available on an arms length basis with unrelated third parties. (ix) maintain an arm's-length relationship with its members and any affiliates; (x) allocate fairly and reasonably any overhead including for office space and employees shared with any member; (xi) use its own separate stationery, invoices, checks and other business forms and have its own telephone number, facsimile number and Internet domain; (xii) take commercially reasonable steps to correct any known misunderstanding regarding its separate identity; (xiii) file its own tax returns, if applicable, as may be required under applicable law; (xiv) pay its liabilities out of its own funds, including the salaries of its own employees, if any; and (xv) not engage in any dissolution, liquidation, consolidation, merger or sale of assets.

Further, in order to establish and maintain "separateness", it may be important that any sub-sublease of a portion of the facilities from the SPE back to the airline (or port operator or other primary transportation tenant or concessionaire) be on an "arms-length" basis. To avoid "disguised financing treatment," such sublease must meet the Seventh Circuit's criteria for a true lease. From an economic standpoint, an airline (or port operator or other primary transportation tenant or concessionaire) may undertake to make payments on terms sufficient to support the creditworthiness of the arrangement and to permit the conclusion that the sub-sublease is a "true lease" for federal bankruptcy purposes. As noted below, it appears that there should be no adverse federal income tax effect of such a restructured architecture. Additionally, apart from any cash that might need to be accumulated at the SPE in support of its credit, there would appear to be no adverse economic effect to the SPE owner of such payments. It would, therefore, seem that such an arrangement could be effected on a basis that would be viewed as representing a "true lease."

Figure 3:
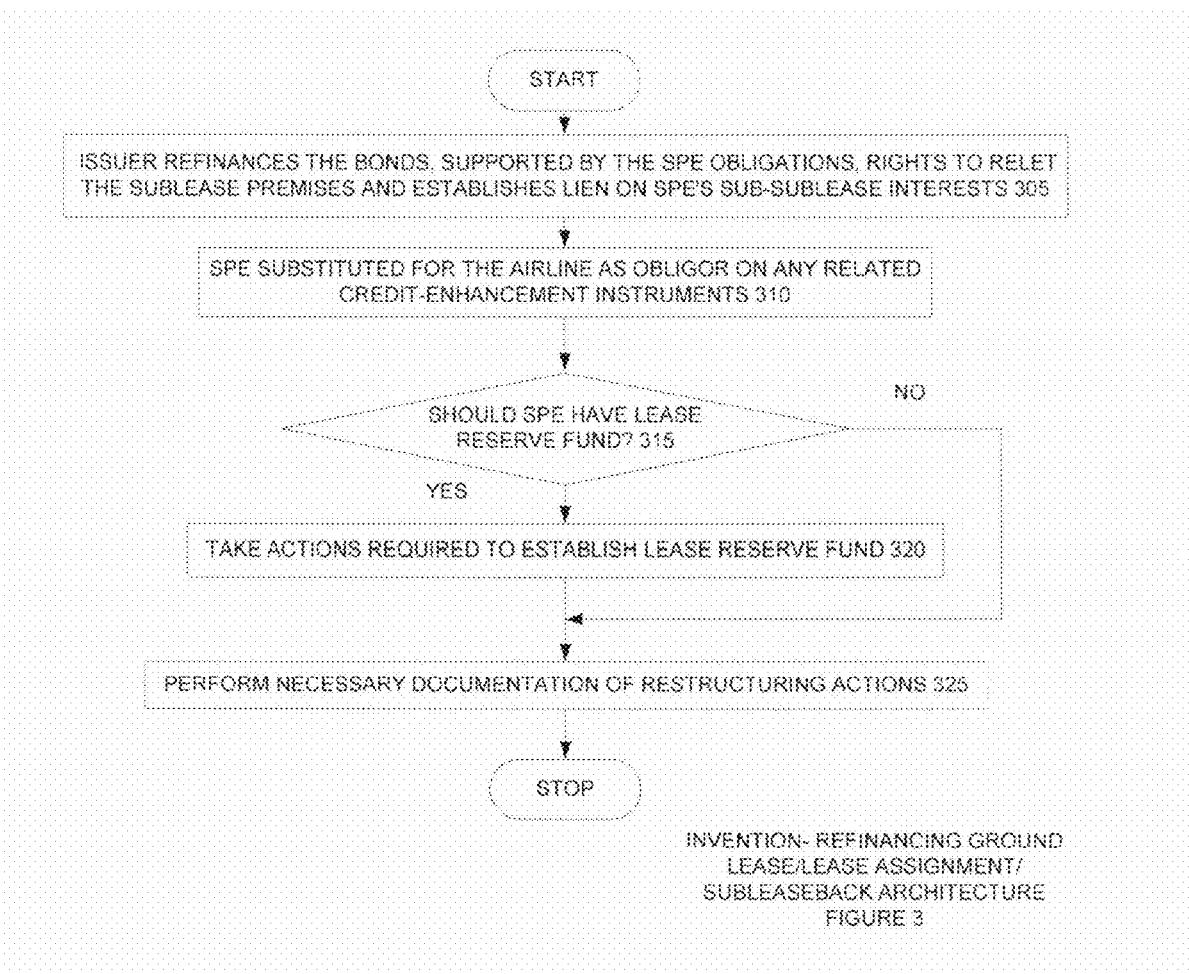
FIG. 3 illustrates various operations performed in connection with restructuring financing architectures in accordance with at least one embodiment of the invention.

Assuming that the facts would support the creditworthiness of the actions illustrated in FIG. 2, various actions may be taken, as illustrated in FIG. 3. For example, at 305, a municipal "conduit" issuer could then refinance the "private activity" bonds, supported only by the SPE's obligations and the pledge of its rights to leases, rents and other revenue associated with the use and occupancy of the facility. Subsequently, at 310, SPE is substituted for the airline on any related credit-support arrangements for the bonds. A determination may then be made, at 315, as to whether the SPE should reserve some portion of its revenues in a lease reserve fund to provide greater assurance of its ability to pay sublease rent payments on a timely basis, e.g., to cover rental payments during any relet period. If it is determined that such a fund should be created, associated actions would be performed at 320 and operations would continue at 325. That practice may, however, be subject to arbitrage yield restrictions applicable to pledged funds. For that purpose, it may be sufficient simply to debit the fund to pay operating costs, if needed. If it is determined that no such lease reserve fund is necessary, the appropriate documentation of the actions performed in FIGS. 2 and 3 may be made at 325. All of the foregoing would apply regardless of the identity of the SPE owner, whether an airline, municipal airport or seaport owner or concessionaire or any combination of any of the foregoing or if the SPE owner is a wholly unrelated third party.

Again, it should be understood that the actions performed in FIG. 3 are merely illustrative of particular implementation options in accordance with at least one embodiment of the invention. Therefore, it is not necessary that the actions be performed in the order illustrated in FIG. 3; rather, each of those actions may be performed in various orders including simultaneously. Moreover, it should be understood that practice of the invention may not require performing all of the operations set forth in that figure or that those operations be performed specifically by the party identified above.

As illustrated in FIG. 4, subject to appropriate documentation, this restructured architecture might permit the bonds 140 to be refinanced on the strength of the demand for the facility and credit and resources of the SPE 485. Additionally, although the bonds 140 could be subject to the exposure of a possible bankruptcy of the SPE 485 (the risk of which could be evaluated by the rating agencies, bondholders and/or any credit support provider, if applicable), the bonds 140 should be sufficiently remote from a bankruptcy of airline or other concessionaire, tenant or other primary user of the facilities 125 as to be priced and rated on the demand for the facilities 145, and the rights and revenue and the credit of the SPE and not such airline or other primary tenant or concessionaire 125.

In FIG. 4, the SPE 485 has acquired the airline's interest in the ground lease and in the facilities sublease. The contributed facilities sublease interest may include the constructed facilities and may also permit the SPE to sub-sublease interests to other airlines. The SPE 485 has assumed the obligations of the facilities sublease (and the ground lease). The airline 125 has entered into a sub-sublease of the facilities 450 with the SPE 485 for the airline's own use of the facilities on substantially identical terms as those of the original lease with the airport 145. The sub-sublease by the airline for facilities must meet the Seventh Court of Appeals' criteria of a "true lease" and shall entail, for example, the airline agreeing to pay a rent on terms sufficient to support the creditworthiness of the arrangement and to permit the conclusion that the sub-sublease is a "true lease" for federal bankruptcy purposes. All rights and revenues of the SPE may then be pledged to secure the bonds (and/or any credit support provider, if applicable). To the extent permitted by the transaction documents and applicable law, the SPE could make periodic distribution of surplus revenues to the airline and/or other equity owners of the SPE, including without limitation, the municipal owner of the airport, maritime port or any other transportation asset.

As a result of such a restructured architecture, there should be a corresponding reduction in the interest charges for which the SPE 485 is responsible, through its loan, facilities subleaseor other debt service arrangements for provision of principal and interest payments to the issuer 130. Alternatively, if the bonds 140 are supported by a letter of credit, bond insurance or other credit support, this restructured architecture should result in a substantial reduction in the charges imposed by the credit support provider as the risk of any failure of timely and full payment is sharply reduced.

A second example is provided regarding how at least one embodiment of the invention may be used to restructure a conventional "ground lease plus loan" architecture. With reference to FIG. 5, consider an existing, conventional "ground lease plus loan" financing architecture 500, wherein city (or other municipal owner) 510 has entered into a ground lease 590 at airport 520 to airline 525 in return for ground lease rent payments 595; an airport authority 535 undertakes to issue revenue bonds 540 to finance the construction of the facilities 545, with the bond proceeds 550 loaned to airline 525 under a loan agreement 565. This "ground lease plus loan" architecture may also apply to a maritime port or other municipally own transportation asset.

For federal income tax reasons, airline 525 must elect to forego tax depreciation deductions for the facilities 545. As a result, a second loop arrangement is included in the architecture. The airline 525 conveys ownership 575 of the facilities 545 to the city 510. In return, the airline 525 takes back a facilities lease 580 (in return also for facilities lease rent payments 585), with a term continuous with that of the bonds 540. The rent payments 585 under the facilities lease 580 include basic rent and additional rent. Basic rent is considered prepaid by the facilities conveyance to be applied ratably over the term of the facilities lease. Additional rent is equal to annual property taxes and other annual operational charges, and costs.

It is possible that the loan agreement 565 to airline 525 may be unsecured. Alternatively, the loan obligation of airline 525 to the bond issuer may be secured by a pledge of its facilities lease 580 interest (e.g., a "leasehold mortgage"). In this architecture, the ground lease interest of the airline 525 may not need to be pledged. The ground lease payments 595 may be fairly modest. In some cases, the ground lease 590 may include a cross-default provision, under which a default of airline 525 under its loan agreement 565 with the city airport authority 530 is automatically an event of default under its ground lease 590 even if payments under that agreement are current. All of the foregoing descriptions are equally applicable to other municipal transportation assets, primary private tenant users, and concessionaires.

In the event of a bankruptcy of airline 525, this architecture is likely to suffer unacceptable events. In particular, if the airline 525 files in bankruptcy and ceases making payments under loan agreement 565, the bond trustee would be delayed from foreclosing on any leasehold mortgage interest in the facilities lease 580 by the "automatic stay" rules. Thus, even though the city airport authority 535 would be a secured creditor in airline's 525 bankruptcy, it would be unable to compel a sale of the facilities lease interest to other potential users of the facilities 545. The authority 535 might eventually receive some restructured monetary amount in settlement of its loan claim, on the resolution of airline's 525 bankruptcy proceeding; the airline's 525 possessory leasehold interests might then be sold off to another airline, which might assume such rights on payment of some amounts in respect of unpaid ground lease rents and facilities lease rents.

Additionally, if the Airline assumes the facilities lease and ground lease 580, 590 and continues to make the annual payments 585, 595 required thereunder, there would be no basis on that account for the city 510 to evict the airline 525 and make the facilities 545 available to some other solvent party (which could also assume the loan payment obligations 570). Further, it is questionable whether an automatic cross-default provision in the facilities lease or the ground lease 580, 590 (if it were triggered by a default under the airline's loan agreement 565 based solely on the airline's bankruptcy) would be enforceable. It may be that the cross-default provision would be a violation of the "ipso facto" rule, and therefore unenforceable, or would be subject to the "automatic stay" provisions of the bankruptcy law.

If an airline 525 files in bankruptcy, and stops performing its obligations under the loan agreement 565 (resulting, after the exhaustion of any operating cost or debt service reserves, in a default in payments on the bonds 540 of the authority 530), it may, in some instances, at the same time retain its possession and use of the financed facilities 545. This would suspend any recovery rights of the bondholders (pending the eventual resolution of the bankruptcy proceedings), and in the meantime block the exercise by the city 510 or the bond trustee (e.g., the authority 535) of any right to dispossess the airline 525 and make the facilities 545 available to other airlines that might be willing and able to pay for usage rights to the facilities 545 in amounts sufficient to provide for current payments of debt service on the bonds 540. All of the foregoing described in the several preceding paragraphs is equally applicable to other municipal transportation assets, primary users, concessionaires, and owners.

In accordance with at least one embodiment of the invention, airline 525 might undertake restructuring transactions as described with reference to FIG. 6. As illustrated in that figure, at 605, the airline may form an SPE of which it is a member, and in some situations, be its only member. Subsequently, at 610, the airline would then assign to the newly created SPE, its rights under the ground lease and the facilities lease (including its rights to any rent prepayment credits thereunder, and any existing sublease agreements it might have with other airlines, or other parties); the SPE would then assume all of the airline's obligations under these agreements and the loan agreement at 615. Next, at 620, the SPE would enter into a sub-sublease agreement with the airline, covering the airline's usage of the facilities.

The sub-sublease rent from the airline would be on terms sufficient to support the creditworthiness of the arrangement and to permit the conclusion that the sub-sublease is a "true lease" for federal bankruptcy purposes. Subject to the transaction documents and applicable law, the airline or any other equity owners, municipal or otherwise, would be entitled to periodic distributions of surplus revenue to equity owners from the SPE.

At 625, the formation documents of the SPE would be drafted to include provisions for at least two independent managers (appointed by the bond trustee, a credit support provider, if applicable, or a named neutral party, e.g., a trust company), and would include provisions precluding the SPE from taking certain actions including a voluntary filing in bankruptcy or a dissolution or liquidation, disposing of substantial assets, or amending its formation documents without the affirmative approval of the independent managers. Those formation documents may also include a requirement that the SPE maintain compliance with various customary standard "separateness" characteristics (as explained above).

Again, it should be understood that the actions performed in FIG. 6 are merely illustrative of particular implementation options in accordance with at least one embodiment of the invention. Therefore, it is not necessary that the actions be performed in the order illustrated in FIG. 6; rather, each of those actions may be performed in various orders including simultaneously. Moreover, it should be understood that all of the foregoing described in the several preceding paragraphs is equally applicable to other municipal transportation assets, primary users, concessionaires, tenants and owners and that the practice of the invention may not require performing all of the operations set forth in that figure or that those operations be performed specifically by the party identified above.

As illustrated in FIG. 7, subject to appropriate documentation, this restructured architecture might permit the bonds 540 to be refinanced on the strength of the demand for the facility leased, revenues of the facility and projected credit of the SPE 705. The airline or port concessionaire or grantee of a privatization right, or the municipal owner of the facilities 525 is a member, and may be, in some situations, the only member of the SPE 705. The rights under the ground lease and the facilities lease are assigned to the SPE 705 by the airline or other primary tenant or concessionaire (such as a port operator) 525. The SPE 705 assumes all of the airline's obligations under the ground lease 790, the facilities lease 780 and the loan agreement 765. The SPE 705 enters into a sublease agreement meeting the requirements of a "true lease" 755 with the airline 525, covering the airline's usage of the facilities (in return for sublease rent payments 760). The SPE may pledge 715 all of its rights and revenues under this sublease and other sources to secure its assumed obligations under the loan agreement 565 (and the SPE's obligation to any credit support provider, if applicable).

The sublease rent payments 760 from airline 525 plus any revenues derived by the SPE 705 with respect to the facilities 545 from other sources include amounts sufficient, in the aggregate, to cover the SPE's cost of operation of the facilities, including any administrative expenses, the SPE's continuing obligations under the ground lease 790 and facilities lease 780 and the SPE's assumed obligations under the loan agreement 765. The SPE may pledge 715 all of its rights and revenues to secure its obligations under the loan agreement 565 (and the SPE's obligations to the credit support provider, if applicable).

The formation documents of the SPE regardless of the identity of the owner(s), 705 may include provisions for at least two independent managers (appointed by, e.g., the host airport, the bond trustee, a credit support provider, if applicable, or a named neutral party, e.g., a trust company), and provisions precluding the SPE 705 from taking certain actions (including a voluntary filing in bankruptcy or a dissolution or liquidation, disposition of substantial assets, or amendment of its formation documents), without the affirmative approval of the independent managers. The formation documents may also include a requirement that the SPE 705 maintain compliance with various, customary standard rating agency mandated "separateness" characteristics (as explained above).

Assuming compliance with the "separateness" provisions, this restructured architecture should warrant a conclusion that the SPE 705 would be restricted from filing bankruptcy itself without the approval of its independent managers and "remote" from any substantive consolidation risk in a bankruptcy of the airline 525. In addition, the SPE 705 could not be dissolved and liquidated into bankruptcy without the approval of its independent managers. As a result, in the event of a bankruptcy of airline 525, and a default in payment of the airline's sublease rent obligations, the SPE 705 (at the direction of its independent managers, the authority, the bond trustee, or any credit-support provider for the bonds, if applicable, as specified in the SPE's formation documents) should be entitled to demand that the airline 525 assume and perform its sublease 755 obligations to the SPE 705 in accordance with the applicable provisions of the U.S. Bankruptcy Code, or reject the sublease 755 and relinquish rights (e.g., possession) under the ground lease 790 and the facilities lease 780 in favor of the SPE 705. In the latter case, the SPE 705 should then be in a position to make the ground lease 790 and facilities lease 780 available to other airlines, on a basis that may enable the SPE 705 to continue making payments under the assumed loan agreement 765.

Additionally, the debt documents will obligate the SPE to enforce its rights against the lessee. And, if the SPE 705 fails for some reason to enforce these rights, and the SPE' assumed obligations under the loan agreement 765 are supported by leasehold mortgages on the SPE's interest in the ground lease 790 and facilities lease 780, the bond trustee should be able to foreclose on such mortgages because the SPE is not in bankruptcy, free of any "automatic stay" restrictions imposed by the bankruptcy of the airline 525, and either sell the leasehold interests or re-sublease the ground and facilities to other airlines and users on a potentially profitable basis, for the benefit of the bondholders.

It should be understood that various embodiments of the invention enable the structuring of a financing architecture for new money as well as the restructuring of an existing financing architecture regardless of the identity of the equity owners of the SPE and regardless of the nature of the municipally owned transportation assets being financed. Thus, the structuring of a new financing architecture such as those illustrated in FIGS. 4 and 7 or the like, is described.

In accordance with at least one embodiment of the invention, an airport, seaport, airline or port concessionaire or any other interested parties might also undertake structured financing for new money in such a way as to provide a financing architecture that corresponds to a conventional "ground lease/lease assignment/subleaseback" financing architecture (see, e.g., architecture 100 in FIG. 1) but with the benefits associated with providing a bankruptcy-remote organization responsible for issued revenue bonds. For example, such actions may be performed as illustrated with reference to FIG. 8. As illustrated in that figure, at 805, an SPE may be formed and be treated as a "disregarded entity" by the airline for federal income tax purposes. Subsequently, at 810, the SPE's formation documents may include provisions for maintaining "separateness" from the airline appropriate for bankruptcy-remote status, and preventing certain actions from being taken without the approval of its independent managers (as explained above). Subsequently, at 815, the SPE enters into a ground lease and a facilities sublease, with the relevant parties (e.g., the city and/or city airport authority). Then, at 820, the airline or other primary users may enter into a sub-sublease of the facilities meeting the requirements of a "true lease" with the SPE for the airline's own use of the facilities. At 825, the SPE also enters into sub-subleases of the facilities with other airlines and other interested parties as well. Those sub-subleases meeting the requirements of a "true lease" may entail, for example, the airlines and/or other interested parties agreeing to pay a rent sufficient to support the creditworthiness of the arrangement and to permit the conclusion that the sub-sublease is a "true lease" for federal bankruptcy purposes. Then, at 830, all rights and revenues of the SPE may be pledged to secure its lease obligations supporting the bonds (and the obligations to the credit support provider, if applicable).

Subsequently, at 835, an issuer issues the bonds, supported only by the SPE obligations. The SPE may then, at 840, be identified as solely responsible on any related credit-support arrangements for the bonds.

A determination may then be made, at 845, as to whether the SPE, regardless of the identity of its equity owners, should reserve some portion of its revenues in a lease reserve fund to provide greater assurance of its ability to pay sublease rent payments on a timely basis, e.g., create a lease reserve fund to cover rental payments during any relet period. If it is determined that such a fund should be created, associated actions would be performed at 850 and continue to be performed at 855. That practice may, however, be subject to arbitrage yield restrictions applicable to pledged funds. If it was determined that no such fund is necessary, the appropriate documentation of the actions performed in FIG. 8 would be made at 855. As a result, of such actions, a financing architecture may be provided as illustrated in FIG. 4.

It should be understood that the actions performed in FIG. 8 are merely illustrative of particular implementation options in accordance with at least one embodiment of the invention. Therefore, it is not necessary that the parties be an airport and airline or the SPE be owned by one or more airlines, but it is equally applicable to any municipally owned transportation assets operated and/or in whole or in part, used by a private user, whether one or more airlines, port concessionaire, or other private users of such municipally owned facilities; Nor is it necessary that the actions be performed in the order illustrated in FIG. 8; rather, each of those actions may be performed in various orders including simultaneously. Moreover, it is not necessary that the SPE be owned by any particular entity or be organized in a particular jurisdiction. Moreover, it should be understood that practice of the invention may not require performing all of the operations set forth in that figure or that those operations be performed specifically by the party identified above.

Similarly, in accordance with at least one embodiment of the invention, an airline and other interested parties might undertake structuring financing transactions in such a way as to provide a financing architecture that corresponds to a conventional "ground lease plus loan" financing architecture (see, e.g., architecture in FIG. 5) but with the benefits associated with providing for a bankruptcy-remote organization to be the ground lessee and the borrower under the loan agreement responsible for repayment of the revenue bonds. For example, such actions may be performed towards such an end as illustrated with reference to FIG. 9. As illustrated in that figure, at 905, an SPE is formed of which the airline may be the only member. Subsequently, at 910, the SPE enters into the ground lease, facilities lease and loan agreement with the appropriate parties (e.g., city and/or city airport authority). The leases may include rights to any rent prepayment credits thereunder.

At 915, the SPE enters into a sublease agreement with the airline, covering the airline's usage of the facilities. The sublease rent from the airline together with any revenues derived by the SPE with respect to the facilities from other sources, including other sublease rental income from other airlines and other service parties (e.g., concessionaires, etc.) would, in the aggregate, be on terms sufficient to support the creditworthiness of the arrangement and to permit the conclusion that the sub-sublease is a "true lease" for federal bankruptcy purposes.

At 920, the formation documents of the SPE are drafted to include provisions for at least two independent managers (appointed by the host airport, bond trustee, a credit support provider, if applicable, or a named neutral party, e.g., a trust company), and include provisions precluding the SPE from taking certain actions (including a voluntary filing in bankruptcy or a dissolution or liquidation, a disposition of substantial assets, or an amendment to its formation documents) without the affirmative approval of the independent managers. The formation documents may also include a requirement that the SPE maintain compliance with various, customary standard "separateness" characteristics (as explained above). At 925, the bonds are financed on the strength of the credit of the SPE.

As a result, of such actions, a financing architecture may be provided as illustrated in FIG. 7, or the like.

Again it should be understood that the actions performed in FIG. 9 are merely illustrative of particular implementation options in accordance with at least one embodiment of the invention. Therefore, it is not necessary that the parties be an airport and airline(s) or that the SPE be owned by one or more airlines, but it is equally applicable to any municipally owned transportation assets operated and/or used in whole or in part by a private user, whether one or more airlines, port concessionaires or other private users of such municipally owned transportation facilities. Nor is it necessary that the actions be performed in the order illustrated in FIG. 9; rather, each of those actions may be performed in various orders including simultaneously. Moreover, it should be understood that practice of the invention may not require performing all of the operations set forth in that figure or by the party identified above.

As alluded to above, it should be understood that various embodiments of the invention have been disclosed herein and interrelated issues and factors are worth consideration by one of ordinary skill.

From a tax standpoint, there may be a number of federal income tax issues relevant to structuring or restructuring performed in accordance with embodiments of the invention. Potential issues seem to arise in three areas: (1) consequences of the structured/restructured transaction; (2) consequences of operations under the resulting financing architecture; and (3) implications for an existing or new tax-exempt bond financing of the facilities.

An assignment of the rights of the airline under the ground lease and facilities sublease to the SPE should have no federal income tax effect, because the SPE is meant to be treated in effect as a mere branch of the airline (if the airline is the only member), or a partnership (if two or more airlines are members) for federal income tax purposes. As a result, the assignments should not be treated as a taxable transaction.

There may be some instances in which the facilities are presently jointly-operated by two or more airlines (or any other primary users), either as a joint venture or through some common legal entity. In such a situation, in accordance with at least one embodiment of the invention, contributing existing rights to a conduit SPE, or contributing interests in an ownership entity to one or more SPEs may achieve the federal income tax effect noted above.

In the case of a single-member SPE, if the SPE is a "disregarded entity" of the airline, its operations, revenue and expenses should have no different federal income tax effect to the airline as a result of the restructure architecture, even if the contractual arrangements between the entities involve a sub-sublease payment obligation from the airline to the SPE. However, if multiple airlines are the sponsor parties, further analysis would be required to determine the effects of restructuring the financing architecture as described above; nevertheless, the potential for partnership treatment of an interposed SPE (or for interposed SPEs of each participating airline) is possible under federal income tax regulations.

In the case of the structuring of a financing architecture for new money, it does not appear that methods and architectures designed in accordance with the invention would involve any significantly different tax-exempt financing considerations than a financing for the direct benefit of the airline. However, when an existing, outstanding tax-exempt issue is involved, other considerations may be relevant. In particular, the form of a restructured architecture designed in accordance with at least one embodiment of the invention may involve a refunding of any existing, outstanding bonds. All of the foregoing descriptions are equally applicable to other municipal transportation assets, primary private tenant users and concessionaires.

In general, if the existing bonds were issued after 1986, the refunding may not present any new or different federal income tax issues for tax-exempt purposes.

If, however, the existing bonds were issued before the effective date of the 1986 Tax Reform Act, there may be a question whether the refunding bonds qualify under transition rules of the 1986 Act, without regard to the new standards for airport facilities financings that were first imposed by that Act. This conclusion might be more easily reached if the SPE is a single-member entity of the airline, rather than a common entity of more than one airline; however, if any change occurs through the interposition of entities above that level, there may be no basis for a distinction.

On the other hand, if the refunding of a pre-1986 bond issue would not be eligible for transition-rule protection, evaluation may need to be performed by bond counsel in light of the changes that have since occurred.

Beyond these tax implications, there may be additional issues posed by the structuring or restructuring of a financing architecture and associated processes. In particular, for example, if a restructured financing architecture requires some accumulation of revenues/contributions at the level of the SPE, for the better assurance of the credit of the bonds (or the credit-support provider, if applicable), care may need to be exercised to assure either that such funds do not constitute "replacement proceeds" of the bonds, subject to an investment yield limitation not greater than the yield of the bonds, or that they comply with such limitations. It is possible that such limitations could be avoided by providing that any such accumulated funds are not pledged for payment of sublease rent, and are at all times subject to debit, if necessary, to pay operating costs of the SPE. If depressed yields are available for temporary investments, this may not be a practical problem, but a method of assuring compliance may need to be considered.

In addition, and wholly apart from the above, any particular restructuring along the lines herein disclosed may require evaluation of relevant state or local income or other tax issues.

Further, it should be understood that the effect of structuring or restructuring financing architectures in accordance with various embodiments of the invention depends, in each case, on the potential strong demand for use of the facilities by others. Thus, the structuring or restructuring of financing architectures cannot guarantee a successful result; that structuring or restructuring may only enable such a result to happen.

Nevertheless, the financing processes and architectures provided in accordance with embodiments of the invention may effectively prevent a ground lease and a facilities lease from being frozen in a possible bankruptcy of an airline, while associated bonds are in default.

While the embodiments of the present invention may have been explained with regard to particular examples of implementation of various embodiments of the invention, it should be understood that many alternatives, modifications and variations will be apparent to those skilled in the art. Accordingly, the exemplary embodiments of the invention, as set forth above, are intended to be solely illustrative, not limiting. Various changes may be made without departing from the spirit and scope of the invention.

For example, although implementations of particular embodiments of the invention have been described in connection with a single airline, it should be understood that the invention may be practiced in connection with the financing or refinancing of facilities for more than one airline, for example, a group or consortium of airlines and/or seaport facilities or any other municipally owned transportation assets and used by any type of private tenant, operator or other concessionaire.

FIGS. 1-9 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method for obtaining financing, the method comprising:
    forming or acquiring an interest in a single-purpose business entity (SPE), with at least one operating requirement that establishes separateness of the (SPE) from one or more separate business entities;
    arranging for the transfer or assignment of the one or more separate business entities' facility or equipment lease obligations to the SPE;
    arranging for the transfer or assignment of rights to revenues of the facility or equipment to the SPE;
    forming a lessee or loan or other contractual relationship with the SPE; and
    receiving a credit rating, computed in a programmed machine, for the financing using a formula that has a parameter of revenues of the SPE, the computed credit rating being superior to a credit rating available to one or more business entities;
    securing bond financing for the facility or equipment on a basis supported by revenue-producing potential of the facility or equipment.

2. The method of claim 1, further comprising treating the single-purpose business entity as a disregarded entity if there is only one separate business entity or treating the single-purpose business entity as a partnership if there is more than one separate business entity.

3. The method of claim 1, wherein securing bond financing is issued on a basis supported by the creditworthiness of the facility or equipment.

4. The method of claim 1, wherein securing bond financing includes refinancing existing bonds.

5. The method of claim 1, wherein the process restructures a ground lease/lease assignment/subleaseback architecture.

6. The method of claim 1, wherein the process restructures a ground lease plus loan architecture.

7. The method of claim 6, wherein the ground lease plus loan is applicable to a maritime port.

8. The method of claim 6, wherein the ground lease plus loan is applicable to a municipality owned transportation asset.

9. The method of claim 1, wherein the at least one operating requirement that establishes separateness of the single-purpose business entity from the one or more separate business entities establishes a board of managers including at least one independent manager unrelated to the one or more separate business entities.

10. The method of claim 7, wherein the at least one operating requirement that establishes separateness of the single-purpose business entity from the one or more business entities is that the single-purpose business entity is not authorized to liquidate or to file in bankruptcy without approval of all its managers, including the independent managers.

11. The method of claim 1, wherein the single-purpose business entity is an LLC.

12. The method of claim 1, wherein the single-purpose business entity is a business trust.

13. The method of claim 1, wherein the financing is for purchase, construction or renovation of a public use facility or equipment.

14. The method of claim 1, wherein the financing is for purchase, construction or renovation of an airport-related facility or equipment.

15. The method of claim 1, wherein the financing is for purchase, construction or renovation of a facility or equipment for a port facility.

16. The method of claim 1, wherein the financing is for purchase, construction or renovation of a facility or equipment for road transportation, rail transportation or a maritime port.

17. The method of claim 1, wherein the forming of the single-purpose business entity includes at least one of: an airport owner, an airport operator, a maritime port owner, an airline, a municipality, a maritime port operator, a tenant and a concessionaire.

18. The method of claim 1, wherein the assignment of the rights to revenue includes the assignment of concession revenue.

* * * * *